H. M. SHEER.
CONVERTIBLE INCUBATOR AND BROODER.
APPLICATION FILED AUG. 12, 1905.

977,973.

Patented Dec. 6, 1910.

UNITED STATES PATENT OFFICE.

HENRY M. SHEER, OF QUINCY, ILLINOIS.

CONVERTIBLE INCUBATOR AND BROODER.

977,973.

Specification of Letters Patent.   Patented Dec. 6, 1910.

Application filed August 12, 1905. Serial No. 273,948.

*To all whom it may concern:*

Be it known that I, HENRY M. SHEER, a citizen of the United States, residing at Quincy, in the county of Adams and State of Illinois, have invented certain new and useful Improvements in Convertible Incubators and Brooders, of which the following is a specification.

My invention relates to an improvement in convertible incubators and brooders, the special purpose of the invention being to provide an incubator or brooder of this character which is almost instantly convertible from one to the other, on the theory that artificial incubation and brooding should as closely as possible adhere to nature's plan of hatching and brooding chicks, and a further object in providing a convertible incubator or brooder is that it saves the expense incident to equipment, as heretofore it has been necessary in the artificial raising of chicks to be provided with both an incubator and a brooder, thus greatly increasing the expense of equipment. In other words, as at present constructed, incubators cannot be used to raise and brood, neither can a brooder be used to hatch eggs, and in consequence it requires an incubator and brooder to do the work, and these incubators and brooders are distinct and different in every way so that the operator must invest in an incubator and brooder before he is enabled to bring off a hatch of chicks and raise them.

With these objects in view, my invention consists in a convertible incubator and brooder capable of being quickly convertible into either or from one into the other, as the requirements may demand, and it further consists in certain novel features of construction and combinations of parts which will be hereinafter described and pointed out in the claims.

Figure 1:
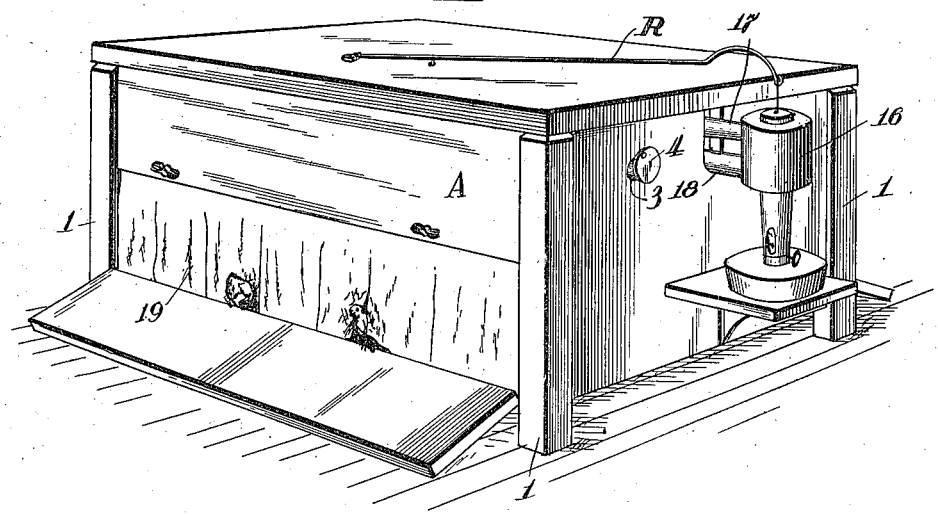
Figure 2:
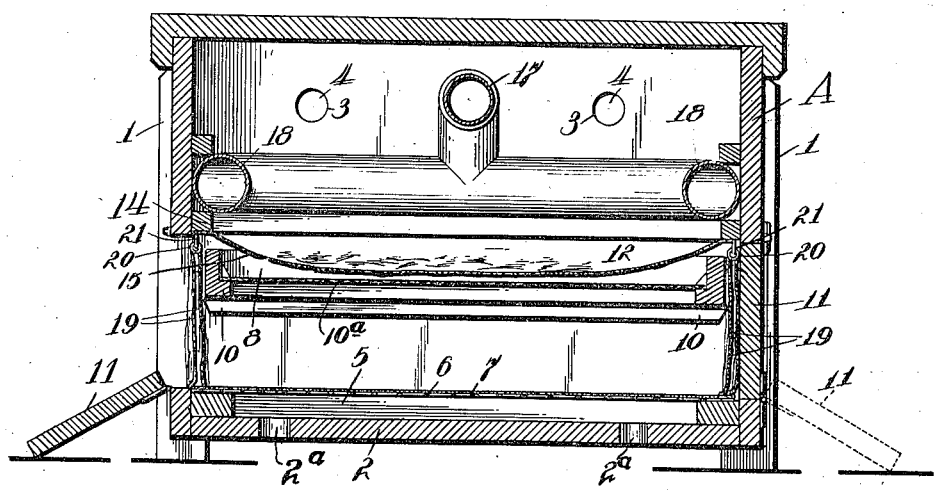

In the accompanying drawings, Figure 1 is a view in perspective, and Fig. 2 is a transverse vertical section.

A, represents the frame of the incubator or brooder preferably mounted on short legs 1, 1, or it may be constructed without legs if desired, and one idea of the invention is to bring it down as close to the ground as possible for the reasons which will appear hereinafter. The bottom 2 may have a plurality of holes 2ª therein for ventilation and the ends of the incubator or brooder in like manner have holes 3, 3, with covers 4, 4 to facilitate an adequate ventilation of the interior. There is nothing special in the matter of ventilation, however, peculiar to this invention, and it is merely referred to as an incident to an operative and successful incubator or brooder. A false bottom 5 rests upon the bottom 2. This comprises a frame with woven wire 6 preferably stretched across, secured thereto with burlap 7 overlaid, it being adapted to furnish a floor for the chicks, while at the same time permitting air to circulate freely therethrough and admit of the bottom being removed to be cleaned or replaced.

The numeral 8 indicates the removable egg tray which slides upon cleats 10, 10, it comprising an outer frame and a bottom 10ª of wire netting, preferably, and is adapted to receive the eggs, it being capable of being removed from the machine from either side through one or the other of the doors 11, 11. The hover 12 is placed above the egg tray and comprises a frame 14 and cheese-cloth 15 or similar material stretched loosely thereacross.

Above the hover is arranged heating apparatus, and while the preferred heater is the subject matter of a concurrently pending application, Serial No. 273,947, filed August 12, 1905, I will briefly describe it in this connection as it is admirably adapted to this convertible incubator and brooder and coöperates with it in the distribution and equalization of heat. It comprises a tank composed of a boiler 16 adapted to be heated by a lamp or similar means and a system of pipes, the central pipe 17 being at the top and leading from the upper end of the boiler throughout the length of the machine and then dipping downwardly and connected with the return pipes 18, 18 which surround the egg chamber on all sides close to the wall thereof, the special advantage of this arrangement being that the greatest heat is at the top, through the center of the apparatus, and sufficiently far from the eggs or chicks to prevent injury thereto, while at the same time the heat radiated therefrom becomes more quickly diffused and the hot water by the time it returns through the main pipes at the lower level is sufficiently cooled so that it will not injure the eggs or chicks which are comparatively close thereto. In other words the hottest pipe is sufficiently elevated so that it is a safe distance away from the eggs or chicks, while at the same time its heat is being utilized just where it is needed to equalize the heat radiation, giving the center of the egg chamber the same temperature as the outer pipes, and the lower pipes at the same time are heating the exterior and more remote parts of the chamber and altogether a uniform heat is being generated. This also enables me to place the outer pipes much closer to the eggs or chicks, and if the center pipe were on a level the chicks could not pass under it on account of the heat which would be greater than it would be if the pipe was not made in the form shown. A heater of this description also produces a rapid and perfect circulation of water, the heated water passing from the top of the boiler through the upper or central pipe to the opposite ends and returning through the outer tubes to the bottom of the boiler.

During incubation the doors 11, 11 are closed and secured to the case, and the eggs are supported in the usual manner upon the tray 8, the heat being supplied through the tank just described, and any form of regulator R may be provided for automatically controlling the heat.

To transform the invention into a brooder the egg tray is removed, the curtains 19, 19 are attached to the hover, hooks and eyes 20, 21, being provided for this purpose, and the doors 11, 11, are swung wide open preferably resting upon the ground at their outer edges, which serve as run-ways for the chicks. In this way by having doors at both sides it not only allows the chicks to pass in and out freely but also prevents the chicks from being crowded into closed corners and smothered, which is a danger always present where only one door is used, which construction forms a regular death-trap as the chicks crowd into the back corners and smother. When two opposite sides are open, if they do crowd they simply force some of the chicks out through the curtains. By use of the curtains, drafts are prevented and the hover being located as it is affords an equal distribution of the heat and prevents the chicks from coming in contact with the hot pipes of the tank.

It is evident that slight changes might be resorted to in the form and arrangement of the several parts described without departing from the spirit and scope of my invention, and hence I do not wish to limit myself to the exact construction herein set forth, but:—

Having fully described my invention, what I claim as new and desire to secure by Letters Patent is:—

1. The combination with the body of an incubator having openings in the bottom thereof, a false bottom supported above the openings in the bottom, of an egg-tray supported in the body, a hover suspended above the egg-tray, a heating means received above the hover, doors at opposite sides of the incubator, and removable curtains suspended along the door-way.

2. The combination with the body of an incubator, having an egg-tray supported therein, provided with a bottom of wire netting, the bottom of the incubator having openings therein, a false bottom composed of cloth and wire netting received above the opening in the bottom, of a heating means received in the body above the egg-tray, a hover suspended between the egg-tray and heating means, doors on opposite sides of the body, and curtains suspended along the door-ways.

In testimony whereof I affix my signature in presence of two witnesses.

HENRY M. SHEER.

Witnesses:
  GERHARD G. ARENDS,
  HENRY DAMHORST.